Figure 1:
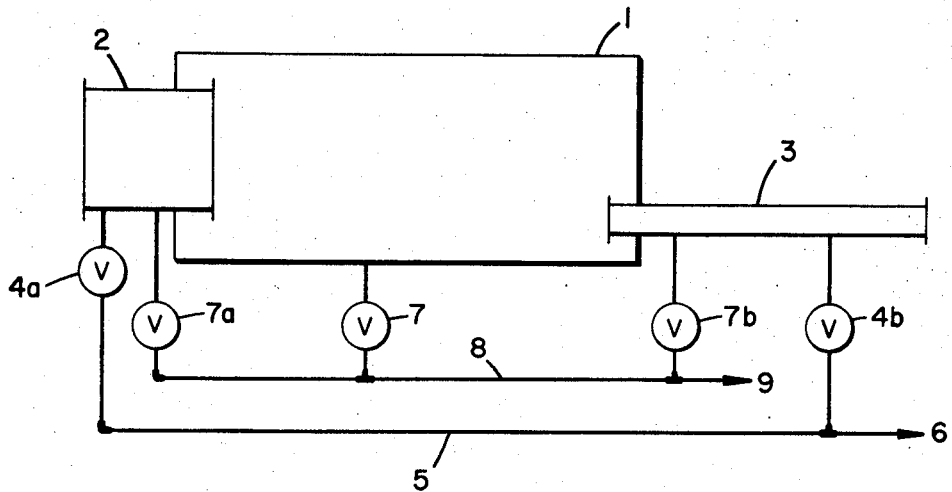

United States Patent [19]
Grin et al.

[11] 3,708,865
[45] Jan. 9, 1973

[54] METHOD FOR MAGNETIC EXPLODING COIL WELDING IN SPECIAL ATMOSPHERES

[75] Inventors: Michel Grin, Varese; Dietrich Pruess, Ispra, both of Italy

[73] Assignee: European Atomic Energy Community (Euratom)

[22] Filed: Sept. 30, 1970

[21] Appl. No.: 76,885

Related U.S. Application Data

[63] Continuation-in-part of Ser. No. 885,188, Dec. 15, 1969.

[30] Foreign Application Priority Data

Dec. 16, 1968 Luxembourg ..........................57,553

[52] U.S. Cl. ..................29/470.1, 29/421 E, 29/488, 29/494, 29/497.5, 219/152
[51] Int. Cl. ...............................................B23k 21/00
[58] Field of Search ......29/494, 497.5, 470.1, 421 E, 29/488, 498; 219/152

[56] References Cited

UNITED STATES PATENTS

| | | | |
|---|---|---|---|
| 2,966,571 | 12/1960 | Markert, Jr. ..........................219/9.5 |
| 3,060,879 | 10/1962 | Staba ..............................29/421 E X |
| 3,166,971 | 1/1965 | Stoecker..........................29/421 E X |
| 3,217,132 | 11/1965 | Schillinger.........................219/137 X |
| 3,417,456 | 12/1968 | Carlson ............................29/497.5 X |
| 3,464,249 | 9/1969 | Klein................................29/421 E X |
| 3,520,055 | 7/1970 | Jarrett................................29/626 X |

FOREIGN PATENTS OR APPLICATIONS

| | | | |
|---|---|---|---|
| 503,076 | 3/1939 | Great Britain..........................29/494 |
| 566,713 | 1/1945 | Great Britain..........................29/494 |
| 1,198,565 | 7/1970 | Great Britain.......................29/497.5 |
| 37/13324 | 1962 | Japan...............................29/470.1 |

OTHER PUBLICATIONS

Vogi et al., "Investigation of Bording with Exploding Foils," Welding Journal Research Supplement, Dec., 1964, pp. 521-S to 525-S.

Primary Examiner—John F. Campbell
Assistant Examiner—Ronald J. Shore
Attorney—Stevens, Davis, Miller & Mosher

[57] ABSTRACT

A hollow body such as a nuclear fuel pencil is exhausted of air and filled with a desired gaseous atmosphere through an opening in the body while within a gas-tight enclosure, is sealed together with a closure member for the opening within a gas-tight flexible bag. The bag containing the body and closure member is removed from the enclosure and the closure member welded to the body by magnetic exploding coil welding while in the bag.

10 Claims, 2 Drawing Figures

MICHEL GRIN
DIETRICH PRUESS
INVENTORS

METHOD FOR MAGNETIC EXPLODING COIL WELDING IN SPECIAL ATMOSPHERES

This application is a continuation-in-part of application Ser. No. 885,188, filed Dec. 15, 1969, for "Welding."

This invention relates to the manufacture of nuclear fuel pencils containing a special gaseous atmosphere. More particularly, this invention is an improvement in the production of such articles whereby closure members may be welded to the tubular casing body in a controlled predetermined atmosphere readily and efficiently.

In the conventional method of producing such fuel pencils, after a first plug has been welded to one end of the tubular cladding for the pencil, a second plug is welded on in the open air, a stem being formed in this plug for use subsequently during a supplementary operation in which the pencil is exhausted and filled with an inert gas. The disadvantage of this method is that it involves additional machining of the second plug and an additional weld in order to close the stem.

The cladding or casing for such nuclear fuel elements generally has been made of aluminum, or certain zirconium alloys, such as "Zircoloy-2." More recently, a so-called "dispersed phase alloy," an alumina-aluminum composite containing about 7% $al_2O_3$, and referred to as "SAP," has been developed for such casings and plugs. Despite its other advantages, however, this material is not amenable to welding by the conventional hot methods which cause a very significant change in the distribution of the second phase resulting in substantial loss of strength and deterioration of other mechanical properties.

It has been found that nuclear fuel pencils of such disperse phase alloys can be welded efficiently and economically by magnetic welding, or welding by magnetic deformation. This procedure is a form of explosive welding which, instead of using the energy of conventional explosive materials, uses the energy liberated by the discharge of a battery of capacitors of high capacitance. Such discharges can take place within a very short period of time (from 10 to 100 microseconds) and thereby develop considerably energies which have been adapted to the shaping of materials and is sufficient to permit carrying out welding operations at low temperatures.

Magnetic welding thus has both the advantages of explosive welding and the operability of magnetic forming; it makes it possible to obtain excellent metallurgical bonds between similar or dissimilar materials without substantial change in structure; it is of flexible use, well adapted to small series work and does not require any special safety conditions.

Such welding procedures are described in "The Magneweld Process (Magnetic Explosive Welding)," by Michel Grin and F. Marchal, paper presented at the conference of Harrogate Advances in Welding Processes, Apr. 14–16, 1970 to be published in Metal Construction and British Welding Journal, and in the paper "Le Magnesoudage," by Michel Grin, F. Marchal and Dietrich Pruess, presented at the Autumn Metallurgy Convention, Paris, France, Oct. 6 to 10, 1969; *Mem. Scient. Revue Metallurgic*, 67 nr. 2, 125–136, 1970.

Briefly, magnetic explosive shaping or welding is carried out as follows: The magnetic coil which is used is formed of a wire or ribbon of suitable conductor material, wound about the article to be shaped or welded and spaced therefrom only a fraction of a millimeter and an electric current sufficiently heavy to volatilize the coil is passed therethrough. The resulting magnetic field is substantially uniform in all directions and augments the force of the shock wave created in the air by the explosive volatilization of the coil.

If necessary or desirable, the conductor of the exploding coil may be coated with enamel or other suitable insulating material. This procedure is not limited to welding of cylindrical articles as the magnetic coil may be adapted to the size and shape of the objects to be welded.

The magnetic force to be applied to the object can be varied at selected positions by variations in the spacing of the turns or the diameter of the coil. The force of the shock wave may be increased by surrounding the coil with a strong and relatively rigid element resistant to deformation which serves to reflect the forces against the article being welded.

For nuclear energy fuel pencils, this welding may be carried out as follows: the tube with plug in place is set within a closely-fitted coil of copper wire and then the electrical energy stored in a suitable capacitor bank is discharged whereby the coil explodes with consequent welding of the tube and closure plug. Although developed especially for welding Al — $Al_2O_3$ alloys, the method is basically suitable for all materials having high electrical conductivity (resistivity lower than $1.5 \times 10^{-8} \Omega$ m), it can be readily extended to other materials of lesser conductivity.

According to the present invention, there is provided a method of filling a hollow body with a gaseous atmosphere and then closing the body by welding a closure member thereto which comprises the steps of exhausting the body of air through an opening in the body, exposing the open, exhausted, body to a gaseous atmosphere within a closed space whereby the atmosphere replaces the air exhausted from the body, sealing the body, with the closure member for the opening in position, within a gas-tight flexible bag and then welding the closure member to the body by magnetic welding.

In a more specific form of the invention, the articles to be welded are placed in a lock communicating with a glove box, the lock is exhausted and then filled with the desired gas, the articles are placed in the glove box and then positioned relative to one another for welding and introduced in this condition into a flexible synthetic plastic bag which is hermetically sealed (for example, hot sealed), whereupon the whole is removed from the glove box and that portion of the whole which is at the level of the weld is introduced into a magnetic welding coil.

Figure 2:
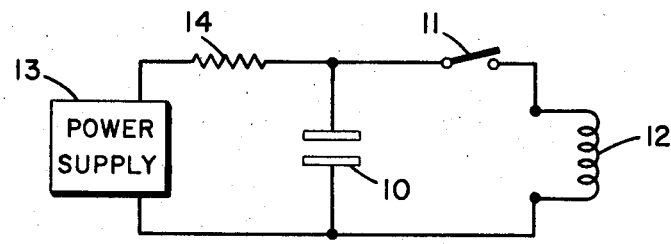

A specific embodiment of the invention as applied to the production of a fuel pencil will now be described with reference to the accompanying drawings, in which FIG. 1 shows more or less diagrammatically the apparatus used for placing the fuel pencil in a bag of a suitable flexible synthetic plastic; and FIG. 2 shows the basic circuit for the magnetic welding.

Essentially, the apparatus is a glove box 1 into which there lead two locks, a lock 2 for introducing equipment (pinch welder, rolled-up synthetic plastic bags, etc.) and a lock 3 for introducing the fuel pencil which is to be welded. The glove box and locks are connected by valves 4a, 4b to a duct 5 connected to a vacuum pump 6 (not shown) and by valves 7, 7a, 7b to a duct 8 connected to gas source 9 (not shown). The lock 2 has a separate circuit (not shown) for supplying and, if desired, for purifying the desired gas.

The tubular cladding, previously welded to a closure plug at one end and filled with the fuel composition, the other end being open, is placed in the lock 3, which is a tube of minimum dimensions necessary to receive the pencil, in order to minimize losses of the inert gas (for example, helium). The lock 3 is then closed, exhausted — the fuel pencil being exhausted simultaneously — and then filled with helium or whatever gas is desired, the fuel pencil filling with this gas at the same time. The pencil is then moved from the lock into the glove box 1, wherein the desired atmosphere is continuously maintained. In the glove box, by means of the equipment introduced through the lock 2, the second plug is put in the open end of the cladding and the fuel pencil is inserted into a flexible bag of synthetic plastic material, for example, polyethylene. The bag is then closed in a conventional manner, for example, by heat sealing. The pencil can then be brought out of the box and handled in the open without taking any special precautions. The second plug is readily welded on the tube by placing a magnetic welding coil over the assembly while in the plastic bag, since the bag does not in any way affect the quality of the weld.

Preferably, the welding coil is of the magnetic explosive type such as shown in FIG. 2. The basic circuit as shown in FIG. 2 comprises an energy storage capacitor 10, a switch 11, a coil 12, and a power supply 13. A practical assembly contains six 60 $\mu$F storage capacitors operating at 8.3KV, giving a maximum stored energy of 12000 J, with a switching section consisting of six ignitrons. When the ignitrons are fired, a resonant LC circuit is formed and several voltage and current oscillations occur in coil 12.

It will be apparent from the foregoing description that this invention eliminates the stem heretofore required on the second plug, with the consequent extra steps of machining and welding, and the welding of the second closure need not be carried out in a special enclosure but in welding equipment in the open since the bag-enclosed fuel pencil can be handled like a naked pencil.

While the foregoing description relates to the specific and preferred embodiment, the manufacture of nuclear fuel elements including a difficultly weldable container and a special atmosphere, this is by way of example only, and the method can be used for any magnetic welding carried out in a special atmosphere. Thus, the elements being welded are not limited to those composed of difficultly weldable materials, but may be formed of any materials amenable to magnetic welding. Likewise, lock chambers 2 and 3 are not essential to the method, so long as the required gas purity can be maintained in the glove box, e.g., by exhausting the glove box and the pencil therein of air and refilling it with the desired atmosphere. However, without such locks, the gas consumption is substantially increased and the operation requires additional time, for the extra operations.

What is claimed is:

1. A method of filling a hollow body with a gaseous atmosphere, which comprises the steps of exhausting the body of air through an opening in the body, exposing the open exhausted body to a predetermined gaseous atmosphere within a closed space whereby the atmosphere replaces the air exhausted from the body, placing a closure member in position within said opening in said body, inserting said body and closure member within a gas-tight flexible bag while in said atmosphere, sealing said bag about said body and closure member to maintain said atmosphere therein, and then welding the closure member to the body by magnetic exploding coil welding while in said bag.

2. A method of explosive welding in a special atmosphere which comprises placing articles to be welded in a glove box or a lock therefor, exhausting air from the said enclosure, filling the enclosure with the desired gas, assembling the articles in a predetermined position relative to one another for welding and inserting the resulting assembly while in the enclosure into a flexible synthetic plastic bag, hermetically sealing the bag around said assembly, removing the thus-enclosed assembly from the glove box, introducing that portion of the whole which is at the level of the weld into a magnetic exploding welding coil, and energizing said coil to cause explosion thereof to effect the weld while in said bag.

3. A method as claimed in claim 2, wherein one of the articles is a nuclear fuel pencil, the cladding of which surrounds the fuel, and to which one plug is already welded, said pencil is introduced into a glove box lock, said lock is exhausted and then filled with the inert gas desired for the fuel element atmosphere, introducing the pencil into the glove box filled with the same gas, placing a second plug into the opening in said pencil, inserting this assembly within a flexible synthetic plastic bag, hermetically sealing the said bag while within said glove box, removing the thus-enclosed assembly from the glove box and placing the same in the open air in a magnetic exploding welding coil, at the level of the weld required for the second plug.

4. A method as claimed in claim 2 in which the welding is effected by the electromagnetic explosion of the coil.

5. A method as claimed in claim 2 in which the bag is made from polyethylene.

6. A method as claimed in claim 2 wherein at least one of the articles to be welded is formed of a material selected from the group consisting of aluminum, aluminum alloys and zirconium alloys.

7. A method according to claim 6 wherein the aluminum alloys is composed of alumina-aluminum containing about 7% alumina.

8. A method according to claim 3 in which the cladding is formed of a material selected from the group consisting of aluminum, aluminum alloys and zirconium alloys.

9. A method according to claim 8 wherein the cladding is formed of an alumina-aluminum alloy.

10. A method as claimed in claim 9 in which the plugs are each composed of an alumina-aluminum alloy.

* * * * *